(12) United States Patent
Huemmer (10) Patent No.: US 12,517,046 B2
(45) Date of Patent: Jan. 6, 2026

(54) CAVITY ENHANCED OPTICAL MICROSCOPY (71) Applicant: Ludwig-Maximilians-Universitaet Munich, Munich (DE)

(72) Inventor: Thomas Huemmer, Augsburg (DE)

(73) Assignee: QLIBRI GmbH, Munich (DE)

( * ) Notice: Subject to any disclaimer, the term of this patent is extended or adjusted under 35 U.S.C. 154(b) by 152 days.

(21) Appl. No.: 18/229,087

(22) Filed: Aug. 1, 2023

(65) Prior Publication Data

US 2024/0044788 A1    Feb. 8, 2024

(30) Foreign Application Priority Data

Aug. 3, 2022    (EP) .................................... 22188532

(51) Int. Cl.
*G01N 21/39* (2006.01)
*G01N 21/03* (2006.01)
(Continued)

(52) U.S. Cl.
CPC ......... *G01N 21/39* (2013.01); *G01N 21/0303* (2013.01); *G01N 21/47* (2013.01);
(Continued)

(58) Field of Classification Search
CPC ............... G01N 21/39; G01N 21/6458; G01N 2021/391; G01N 2021/392;
(Continued)

(56) References Cited

U.S. PATENT DOCUMENTS 6,377,350 B1 * 4/2002 Paldus ...................... G01J 3/10
356/519
8,085,402 B2   12/2011 Ichimura et al.
(Continued)

FOREIGN PATENT DOCUMENTS

EP    2844977 B1    7/2021

OTHER PUBLICATIONS

Mader, Matthias "A scanning cavity microscope", Dissertation an der Fakultat fur Physik der Ludwig-Maximilians-Universitat Munchen Sep. 2018. pp. 1-163. XP093014362. DOI:10.52827/edoc.322946 [retrieved on Oct. 1, 2025]. Retrieved from the Internet :<URL: https://edoc.ub.uni-muenchen.de/22946/1/> (Year: 2018).*
(Continued)

*Primary Examiner* — Dominic J Bologna
(74) *Attorney, Agent, or Firm* — Ewers IP Law PLLC; Falk Ewers (57) ABSTRACT

According to a method for cavity enhanced microscopy, a sample is arranged on a sample carrier of an optical cavity, which is formed by a pair of opposing mirrors. A description defining a lateral motion of the sample during a predefined time interval and a variation of the cavity length during the time interval in a temporally synchronized manner is stored and an actuator system is triggered to move the sample
(Continued)

carrier and/or at least one mirror of the pair of mirrors to effect the lateral motion of the sample with respect to the cavity and the variation of the cavity length according to the description. Light is introduced into the cavity and transmitted portions and/or reflected portions and/or scattered portions and/or emitted portions are detected to generate a sensor dataset.

20 Claims, 4 Drawing Sheets

(51) Int. Cl.
| | |
|---|---|
| *G01N 21/47* | (2006.01) |
| *G01N 21/59* | (2006.01) |
| *G01N 21/63* | (2006.01) |
| *G01N 21/64* | (2006.01) |
| *G01N 21/65* | (2006.01) |
| *G02B 21/06* | (2006.01) |

(52) U.S. Cl.
CPC ....... *G01N 21/4738* (2013.01); *G01N 21/474* (2013.01); *G01N 21/59* (2013.01); *G01N 21/63* (2013.01); *G01N 21/6402* (2013.01); *G01N 21/6458* (2013.01); *G01N 21/65* (2013.01); *G02B 21/06* (2013.01); *G01N 2021/391* (2013.01); *G01N 2021/392* (2013.01); *G01N 2021/651* (2013.01); *G01N 2201/0853* (2013.01); *G01N 2201/103* (2013.01)

(58) Field of Classification Search
CPC ..... G01N 2201/0853; G01N 2201/103; G01N 21/0303; G01N 21/47; G01N 21/4738; G01N 21/474; G01N 21/59; G01N 21/63; G01N 21/6402; G01N 21/65; G01N 2021/651; G02B 21/06
See application file for complete search history.

(56) References Cited

U.S. PATENT DOCUMENTS

| | | | | |
|---|---|---|---|---|
| 2005/0158868 | A1* | 7/2005 | Trebbia | G01N 21/253 436/171 |
| 2007/0145236 | A1* | 6/2007 | Kiesel | G01J 3/2803 356/226 |
| 2008/0111993 | A1* | 5/2008 | Miller | G01N 21/39 356/437 |
| 2016/0131581 | A1* | 5/2016 | Sun | G01B 11/14 356/318 |

OTHER PUBLICATIONS

European Search Report issued in European Patent Application No. EP 22188532.0, dated Jan. 30, 2023 (from which this application claims priority) in English.

Hunger, D. et al.: "A fiber Fabry-Perot cavity with high finesse." New Journal of Physics 12, 065038 (2010).

* cited by examiner

CAVITY ENHANCED OPTICAL MICROSCOPY

CROSS REFERENCE TO RELATED APPLICATIONS

This application claims priority to European patent application EP 22 188 532.0, filed Aug. 3, 2022, the entire content of which is incorporated herein by reference.

TECHNICAL FIELD

The present disclosure is directed to a method for performing cavity enhanced microscopy of a sample and to an optical sensor system for performing cavity enhanced microscopy of a sample.

BACKGROUND

Optical cavities formed by two opposing mirrors are known as tools to enhance the interaction between light and matter by forming an optical resonator. In general, only light with certain wavelengths may pass, enter or transmit the resonator, in which case the light is said to be in resonance with the optical cavity, while other wavelengths are blocked. The spectral separation between wavelengths that may pass the cavity is denoted as free spectral range, FSR, and is mainly determined by a distance between the two opposing mirrors forming the resonator.

For macroscopic cavities, where the mirror separation is large compared to the wavelength of light, the corresponding FSR is relatively small. For microscopic cavities, however, the cavity length approaches the order of magnitude of the wavelength of light and correspondingly the FSR attains larger values. In such scenarios, individual cavity resonances may be singled out by optical filtering techniques. When investigating samples that are introduced into the microscopic cavity, the properties of such individual resonances are of interest. The publication D. Hunger et al.: "A fiber Fabry-Perot cavity with high finesse." New Journal of Physics 12, 065038 (2010) describes a fiber-based Fabry-Perot micro-cavity with CO2 laser-machined mirrors.

The publication M. Mader et al.: "A scanning cavity microscope.", Nature Communications 6, 7249 (2015) contains a general description of scanning cavity microscopy.

The document EP 2 844 977 B1 describes active chemical sensing using an optical microcavity. The used sensor comprises a pair of mirrors opposed along an optical axis and shaped to provide an optical cavity with stable resonance in at least one mode, see for example paragraph [0061], and having a cavity length of at most 50 μm. An actuator system is arranged to move the mirrors relative to each other along the length of the optical cavity for tuning the wavelength of the mode of said cavity. A chemical sample is introduced inside the optical cavity, a radiation source illuminates the cavity and a detector detects radiation emitted from, transmitted through, or reflected from the optical cavity.

Open-access optical micro-cavities may be equipped with an actuator that allows to change the distance between the two opposing mirrors. When light of a specific wavelength is coupled into the resonator, the actuator can be used to tune the mirror separation to a cavity length that makes the cavity resonant with the incoming light, see for example equation (1) in EP 2 844 977 B1. With this approach, in particular, the maximum transmitted light intensity is accessible. However, for this mode of operation, an accurate stabilization of the mirror separation against mechanical fluctuations and electronic noise in the actuator is necessary in order to keep the transmission signal at its desired value. For highly reflective mirrors, the required stability can be down to the picometer scale.

To achieve the required stability, secondary techniques may be applied, like the additional use of light with another wavelength, which is used to generate a signal that aids the stabilization procedure. The use of such techniques introduces additional complexity in handling the micro-cavity and performing the signal detection, which makes this method undesirable for many applications.

Different approaches sweep the cavity length over an extended range such that one or more cavity resonances for the wavelength of the incoming light lie between the start and the endpoint of the sweep, as described in the above mentioned publication of D. Hunger et al. This, however, raises the need for a large number of datapoints recorded along the sweep, in order to properly resolve the potentially narrow cavity resonances, which leads to a significant increase in measurement time.

SUMMARY

It is an objective of the present disclosure to provide a possibility for cavity enhanced microscopy, using in particular a microscopic optical cavity, which increases the achievable rate of data acquisition.

This objective is achieved by a method and an optical sensor system for performing cavity enhanced microscopy of a sample, as described herein.

The disclosure is based on the idea to store a precomputed description of a lateral motion of the sample synchronized with a variation of the cavity length of the optical cavity during a predefined time interval. Then, an actuator system is triggered to effect the entire lateral motion and the entire variation of the cavity length according to the stored description. During the lateral motion and the variation of the cavity length, light is introduced into the cavity and reflected and/or transmitted and/or scattered portions and/or light emitted from the cavity in response to the introduced light are detected to generate a sensor dataset. In this way, the lateral motion of the sample with respect to the optical cavity may be carried out in a synchronized manner with respect to the variation of the cavity length and also the data readout may be temporally synchronized with the motion of the sample with respect to the optical cavity and the variation of the cavity length.

According to an aspect of the disclosure, a method for performing cavity enhanced microscopy of a sample is provided. Therein, the sample is arranged in an optical cavity, in particular a microscopic optical cavity, which is formed by a pair of opposing mirrors and has a variable cavity length. Therein, the cavity length is given by a distance between the pair of mirrors, in particular along a longitudinal direction of the optical cavity, for example measured at a lateral center of the optical cavity. To arrange the sample in the optical cavity, the sample is placed on a sample carrier, which is formed by one of the pair of mirrors, in particular by a first mirror of the pair of mirrors or a second mirror of the pair of mirrors, or is arranged between the pair of mirrors, in particular is formed by a separate sample carrier, which is arranged between the pair of mirrors.

A description defining a lateral motion, in particular a precomputed lateral motion, of the sample with respect to the optical cavity, in particular with respect to the lateral center of the optical cavity, during a predefined time interval and a variation of the cavity length, in particular a precomputed temporal variation of the cavity length, during the time interval in a temporally synchronized manner is stored, in particular to a storage device in a computer-readable fashion.

The lateral motion, in particular the entire lateral motion, of the sample with respect to the optical cavity during the time interval and the variation of the cavity length, in particular the entire variation of the cavity length, during the time interval according to the stored description are effected. To this end, an actuator system is triggered, in particular by a control circuit, to move the sample carrier and/or at least one mirror of the pair of mirrors, in particular by generating a single trigger signal.

Light is introduced into the optical cavity or, in other words, is emitted into the optical cavity, in particular by a light source, for example controlled by the control circuit, during the lateral motion and during the variation of the cavity length, in particular during the time interval. Transmitted portions of the introduced light, which are, in particular, transmitted through the optical cavity, and/or reflected portions of the introduced light, which are, in particular, reflected from the optical cavity, and/or scattered portions of the introduced light, which are, in particular, scattered from the optical cavity and/or portions of light emitted from the optical cavity in response to the introduced light, are detected, in particular by at least one optical detector. A sensor dataset is generated depending on the detected transmitted portions and/or the detected reflected portions and/or the scattered portions and or the portions of light emitted from the optical cavity, in particular by an evaluation circuit, and is for example stored, for example to the storage device or a further storage device.

Therein, the dataset is generated, in particular, according to the temporal synchronization between the lateral motion and the variation of the cavity length.

Here and in the following, "light" may be understood such that it comprises electromagnetic waves in the visible range, in the infrared range and/or in the ultraviolet range. Accordingly, the expression "optical" may be understood to be related to light according to this meaning.

The light source may, in particular, be implemented as a laser light source, which comprises, for example, one or more lasers, in particular infrared lasers. The laser light source may for example be configured to emit light with an essentially mono-frequent wavelength, which may be for example, but not necessarily, a wavelength between 600 nm and 900 nm, for example, 780 nm.

In alternative implementations, the light source may be implemented as a supercontinua light source or as a light emitting diode, LED, or as a superluminescent diode, SLED.

In particular, when varying the cavity length, the length may be tuned, such that the introduced light is in resonance with the optical cavity at least once during the time interval.

In particular, the optical cavity is designed to form at least one stable cavity mode, wherein the cavity length may be varied such that a center wavelength of the cavity mode is equal to the wavelength of the introduced light during the time interval. In other words, the optical cavity may also be denoted as an optical resonator, which is in resonance with the light at least once during the time interval.

The variation of the cavity length corresponds to a variation of the distance between the opposing mirrors. It is noted that varying the cavity length does not necessarily imply that the absolute value of the cavity length is known. However, an approximate estimation of the absolute cavity length and/or the wavelength of the cavity modes may be beneficial to define respective starting and/or final positions for varying the distance between the opposing mirrors.

Regarding the design of the respective mirror surfaces of the first and the second mirror of the pair of opposing mirrors, different options are possible. For example, at least one of the pair of mirrors has a concave mirror surface.

For example, the first mirror may have a concave first mirror surface, while the second mirror has a planar or approximately planar second mirror surface opposing the concave first mirror surface. The sample carrier may then, for example, be given by the second mirror or the second mirror surface, respectively. In other words, the sample may be placed on the second mirror surface. It is also possible, however, to realize the optical cavity by two opposing mirrors, which both have a planar or approximately planar mirror surface.

Alternatively, the sample carrier may be implemented as a separate sample carrier arranged between the first and the second mirror surface, wherein "separate" refers to the fact that it is neither given by the first mirror surface nor by the second mirror surface. In this case, the sample may be considered to be freely suspended between the first and the second mirror surface.

On the other hand, in some implementations, the first mirror surface and the second mirror surface may both be concave. Also in this case, the second mirror surface may form the sample carrier, if the lateral extension of the second mirror is sufficiently large to place the sample. Alternatively, also here the sample carrier may be designed as the separate sample carrier arranged between the first and the second mirror surface.

The concave first and/or second mirror surface may for example be realized by respective end facets of optical fibers, which may in some implementations be additionally coated by a reflective coating, as respective mirrors. In case of a planar second mirror surface, the second mirror may for example comprise a macroscopic substrate with a highly reflective coating and/or may be designed as a macroscopic Bragg mirror or Bragg reflector. In such implementations, the second mirror may be denoted as a macroscopic mirror. It is noted that, nevertheless, the optical cavity may be denoted as a microscopic optical cavity, since the lateral extension of the microscopic optical cavity is given by the space between the opposing mirrors surfaces.

In case of a concave mirror surface, the respective mirror surface has a lateral center. The normal direction to the concave mirror surface at the lateral center may be considered as the direction, according to which the cavity length is defined. In case both mirror surfaces are concave, the cavity length may for example be defined as distance between the respective lateral centers of the two concave mirror surfaces. In case of a concave mirror surface opposing a planar mirror surface, the cavity length may be defined as the distance between the lateral center of the respective concave mirror surface and the planar mirror surface.

The lateral motion may be considered as a motion of the sample with respect to the optical cavity in a lateral direction, which is perpendicular to the longitudinal direction.

A respective radius of curvature of a concave mirror surface, in particular of the end facet of the respective optical fiber, if applicable, may lie in the interval [5° μm, 5000° μm], for example in the interval [10° μm, 200° μm] or in the interval [20° μm, 100° μm] or in the interval [20° μm, 50° μm].

In order to vary the cavity length, at least one first actuator of the actuator system may move the first mirror with respect to the second mirror. For example, the first mirror may stay fixed, while the second mirror is moved or vice versa, or both mirrors may be moved by the at least one first actuator.

For example, the cavity length may be varied in a range from 0.2° µm to 1000° µm, for example from 1° µm to 100° µm or from 2° µm to 10° µm.

For example, in case the sample carrier is formed by the second mirror, at least one second actuator of the actuator system may move the second mirror or the first mirror with respect to each other along a first lateral direction, which is perpendicular to the longitudinal direction, to effect the lateral motion. If the sample carrier is designed as the separate sample carrier, which is arranged between the first and the second mirror, the at least one second actuator may move the separate sample carrier, while the first and the second mirror are fixed to effect the lateral motion. Alternatively, the at least one second actuator may move the first mirror and the second mirror to effect the lateral motion, while the sample carrier is fixed.

In case the sample carrier is designed as the separate sample carrier, which is arranged between the first and the second mirror, the sample carrier may remain fixed in the longitudinal direction when the first mirror is moved with respect to the second mirror in order to vary the cavity length. Alternatively, the sample carrier may be moveable in the longitudinal direction, for example in order to place the sample in the appropriate position in the light field when varying the cavity length.

Arranging the sample in the optical cavity may be understood that at first the optical cavity is formed by arranging the pair of opposing mirrors accordingly and then the sample is placed into the already formed optical cavity. Alternatively, however, the sample may be placed on the sample carrier before the optical cavity is formed, and the opposing mirrors may be arranged accordingly after the sample has been placed. The latter option may be particularly beneficial to manually place the sample on the sample carrier.

The lateral motion of the sample relative to the optical cavity and the variation of the cavity length are defined by the description in a temporally synchronized manner. That means that for any time or time step in the time interval, a corresponding lateral position according to the lateral motion and a corresponding cavity length according to the variation of the cavity length are stored or defined in the description. Afterwards, when the actuator system has been triggered accordingly, the actuator system causes the lateral motion and the variation of the cavity length automatically according to the description in the synchronized manner defined by the description without any further trigger being necessary. It is noted that the lateral positions and/or cavity lengths may be directly stored in the description or the description may store information, which allows to derive said lateral positions and/or cavity lengths uniquely, for example one or more parameters for computing the lateral positions and/or cavity lengths.

For example, the actuator system may comprise an actuator control circuit, which is coupled to all actuators of the actuator system. The actuator control circuit may be configured to generate respective control signals, in particular time-dependent control signals, and provide them automatically to the respective actuators to effect the lateral motion and the variation of the cavity length. For example, the control signal may be control voltages, in particular if the actuators are designed as piezo actuators. The description may therefore store a description of all required control signals directly or indirectly. Consequently, when the control circuit, for example a clock generator of the control circuit, generates the single trigger signal, it may be provided to the actuator control circuit and, in response to the single trigger signal, the actuator control circuit may generate the control signals as stored in the description and provide them to the actuators.

In a ray optics picture, the light may be considered to be introduced into the optical cavity, where it undergoes a plurality of reflections from the first and the second mirror surface. Then, depending on the wavelength of the introduced light and the current cavity length, the light may be transmitted, reflected, scattered or emitted from the optical cavity. The corresponding transmitted and/or reflected and/or scattered and/or emitted portions are detected. For example, an optical fiber may be coupled between the light source and the first mirror, in particular in case the first mirror surface is formed by the end facet of the optical fiber. The transmitted portions may then, for example, pass through the opposing second mirror and be detected accordingly. On the other hand, the reflected portions may be reflected back into the optical fiber and be detected accordingly.

The at least one optical detector may comprise at least one optical detector arranged to detect the transmitted portions and/or at least one optical detector arranged to detect the reflected portions and/or at least one optical detector arranged to detect the scattered portions and/or at least one optical detection arranged to detect the portions of light emitted from the optical cavity in response to the introduced light.

The light being emitted by the optical cavity in response to the introduced light may for example origin from stimulated emission of the sample, fluorescence of the sample, photoluminescence of the sample, Raman scattering of the sample et cetera.

The at least one optical detector may for example be implemented as respective CCD-sensors, CMOS-sensors, avalanche photodiodes or photomultipliers, such as silicon photomultipliers.

Since, the number of times the light passes the sample within the optical cavity is significantly increased by the multiple reflections, the probability for an interaction of the light with the sample is increased. This may be denoted by cavity enhancement. In particular, by increasing the dwell time, the amount of light, which is absorbed by the sample, may be increased significantly leading to a significantly increased detectability of absorption phenomena.

Assuming that no sample is present in the optical cavity, a variation of the cavity length as described leads to one or more dips in the intensity of the reflected portions of the light and to corresponding peaks in the transmitted portions. The positions of the peaks and dips correspond to the respective cavity modes of the optical cavity. The position, shape, amplitude and/or number of dips and peaks may be affected by the presence of the sample in the optical cavity and, in particular, by the absorption of light by the sample. Therefore, the sensor dataset reflects the physical properties, in particular absorption or scattering properties, of the sample. Due to the lateral motion, a spatial resolution of these properties or the respective effect on the peaks and dips in the transmission and reflection, is achieved. Consequently, the sensor dataset may be used to generate one-dimensional or two-dimensional images of the sample by illustrating the desired physical properties accordingly. Due to the spatial resolution, the described method may be considered as a method for microscopy, in particular for cavity enhanced microscopy.

It is noted that also three-dimensional microscopy may be possible by performing the respective steps for different positions of the sample in the longitudinal direction, in particular if the sample carrier is designed as the separate sample carrier.

In case the first mirror is designed as the end facet of the optical fiber, the second mirror is designed as the planar microscopic mirror and the first mirror is moved laterally with respect to the second mirror for effecting the lateral motion, the actual position of the optical cavity on the second mirror is changed. However, in any case, the opposing mirrors keep forming the optical cavity during the time interval.

The sample may be provided in a liquid phase or solid phase or even in a gaseous phase, for example providing the gaseous sample in a suitable container, which is placed on the sample carrier. The sample may also comprise a suspension of solid particles in a liquid, a solution of a substance in a solvent, et cetera.

In particular, with the lateral motion synchronized with the variation of the cavity length, the response of individual cavity resonances to the properties of the sample can be investigated in a spatially resolved manner. For example, variations in the properties of the cavity modes, also denoted as cavity resonances, can be recorded at different sample positions and allow to reconstruct maps in two or three dimensions of the sample in question, for example a highly sensitive image of the absorption of a sample, thereby forming a cavity-based microscope.

When monitoring the transmitted and/or reflected and/or scattered and/or emitted portions of light, light transmission and/or reflection and/or scattering and/or emission as a function of the cavity length variation can be recorded and used to derive properties of interest of the cavity resonances. An advantage of this method is that it does not rely on additional cavity length stabilization procedures. On the other hand, the cavity resonance to be detected may be very narrow compared to the range of the cavity length variation, depending on the nature of the incoming light and the design of the opposing mirrors. Therefore, it is beneficial to record a large number of datapoints along the cavity length variation.

The maximum number of recordable datapoints per time limits the speed for varying the cavity length. The method according to the disclosure represents an approach to determine the properties of the resonances for different points of the sample in order to allow for rapid data acquisition and efficient generation of two-dimensional maps of samples introduced in the resonator.

Due to the synchronized lateral motion and cavity length variation, which is enabled in particular by storing the precomputed description and using it to trigger the actuator system, for example an entire line along the first lateral direction may be sampled in a single step. For example, by repeating this procedure for multiple steps along one or more further lateral directions different from, in particular orthogonal to, the first lateral directions, an array of sample points may be probed, for example in a line-by-line fashion. In particular, this approach allows to generate an image or a one-dimensional or higher-dimensional map of the sample while offering a significant benefit in measurement speed by virtue of recording entire lines or even an entire higher-dimensional slice of in a single step.

Since the precomputed description stores the synchronized lateral motion and cavity length variation, this information may be used to generate the dataset, in particular to associate each measurement with the correct lateral position and the correct cavity length when the measurement has been performed. In other words, generating the dataset includes generating a time series of measurement values, which can also be denoted as an unordered data stream of measurement values, depending on the detected transmitted portions and/or the detected reflected portions and/or the detected scattered portions and/r the detected emitted portions, and assigning each measurement value to a corresponding lateral position according to the lateral motion defined by the description and a corresponding cavity length according to the variation of the cavity length defined by the description.

Furthermore, according to the disclosure, stabilization procedures may not be necessary.

According to several implementations of the method, the variation of the cavity length is effected by varying the distance between the pair of mirrors along the longitudinal direction of the optical cavity.

According to several implementations, the lateral motion of the sample with respect to the optical cavity is defined by a predefined sequence of lateral displacements of the sample carrier relative the optical cavity along the first lateral direction, which is perpendicular to the longitudinal direction of the optical cavity. The description comprises the sequence of lateral displacements, in particular a representation of the sequence of lateral displacements.

Each of the lateral displacements may be defined with respect to the lateral center of the optical cavity or with respect to another lateral reference position. However, each of the lateral displacements may also be defined with respect to the respective current absolute position of the sample carrier. In other words, in case the absolute position of the sample carrier shall be positioned at positions $x_1$, $x_2$, $x_3$, ..., $x_N$ along the first lateral direction and the lateral reference position is given by $x=0$, the lateral displacements may be given by $x_1$, $x_2$, $x_3$, ..., $x_N$ in the first case or by $x_1$, $(x_2-x_1)$, $(x_3-x_2)$, ..., $(x_N-x_{N-1})$ in the second case.

In particular, the description comprises a respective value for each of the displacements. For each of the lateral displacements, the respective order within the sequence is also stored.

In particular, the lateral motion is effected by setting the lateral displacements consecutively according to the predefined sequence. To this end, the actuator system may move the sample carrier with respect to the optical cavity, if the sample carrier is designed as a separate sample carrier, or may move the first and/or the second mirror with respect to the sample carrier or with respect to each other, in particular if the sample carrier is formed by one of the pair of opposing mirrors.

During the lateral motion, the cavity length is varied accordingly. For example, after one of the lateral displacements has been set, a sweep along the longitudinal direction varying the cavity length is effected, and after the sweep, the next lateral displacement according to the sequence stored in the description is set and so forth.

According to several implementations, the description comprises a respective temporal cavity length variation profile for each of the lateral displacements. Each of the lateral displacements is set consecutively according to the predefined sequence, in particular by moving the sample carrier and/or the first and/or the second mirror accordingly. For each of the lateral displacements, the cavity length is varied according to the respective cavity length variation profile.

The cavity length variation profile may for example be understood as a temporal profile or, in other words, a value for the distance between the optical mirrors or a value for the respective change in the distance between the optical mirrors as a function of time. Therein, the cavity length variation profile may be given in a continuous manner or as a series of discrete values for the change in the distance, for example.

In other words, the cavity length variation profiles for different lateral displacements of the sequence may differ from each other. For example, the different cavity length variation profiles and different lateral displacements may differ from each other by respective offsets in the distance between the opposing mirrors. For example, the different cavity length variation profiles may be identical to each other apart from that offsets. However, also more complex constructions and differences between the individual cavity length variation profiles are possible.

In this way, spatial and/or temporal drifts of the cavity resonant position may be further suppressed. The offset values may for example be recorded previously and stored together with the description or as a part of the cavity length variation profile, respectively. This is particularly beneficial, since it allows to carry out the whole data acquisition according to the first time interval without interruptions or additional triggers being necessary, which in turn increases the measurement speed. Furthermore, the total amount of data that needs to be recorded may be reduced as a smaller cavity length modulation around certain resonances may be required.

In a simple example, the cavity length variation profile may correspond to a linear increase of the cavity length from an initial value to a defined final value and a linear decrease back to the initial value. The initial and/or final value may be subjected to the one or more offsets. However, also more complex trajectories in the longitudinal direction are possible.

According to several implementations, a first cavity length variation profile associated to a first lateral displacement of the sequence of lateral displacements differs from a second cavity length variation profile associated to a second lateral displacement of the sequence of lateral displacements.

In some implementations, the first cavity length variation profile differs from the second cavity length variation profile by a constant offset, in particular only by the constant offset.

According to several implementations, the lateral motion of the sample with respect to the optical cavity is defined by the sequence of lateral displacements of the sample carrier relative to the lateral center of the optical cavity along the first lateral direction at a predefined first position of the sample carrier relative to the lateral center of the optical cavity along a second lateral direction, which is perpendicular to the longitudinal direction of the optical cavity, and is in particular different from the first lateral direction, for example, orthogonal to the first lateral direction.

For example, the first lateral direction may be considered as line direction or a scanning line direction, wherein different positions in the second lateral directions define different lines to be scanned. For example, the first lateral direction may be the x-direction, the second lateral direction may be the corresponding y-direction, and the longitudinal direction may be the corresponding z-di recti on of a Cartesian coordinate system.

According to several implementations, a further description defining a further lateral motion of the sample with respect to the optical cavity during a predefined further time interval and a further variation of the cavity length during the further time interval in a temporally synchronized manner is stored. Therein, the further lateral motion of the sample with respect to the optical cavity is defined by a predefined further sequence of lateral displacements of the sample carrier relative to the lateral center of the optical cavity along the first lateral direction at a predefined second position of the sample carrier relative to the lateral center of the optical cavity along the second lateral direction.

In other words, while the description defines the lateral motion and the variation of the cavity length for a first scanning line given by the first position along the second lateral direction, the further description defines the lateral motion along the first lateral direction and the corresponding further variation of the cavity length for a second scanning line given by the second position along the second lateral direction. The explanations with respect to the description carry over analogously to the further description. Furthermore, one or more, in particular a plurality, of further positions along the second lateral directions, may be defined, and respective further descriptions may be stored such that for each scanning line corresponding description is stored.

It is noted that also the positions along the second lateral direction may be considered as relative positions or displacements. In particular, it is not necessarily required to know absolute positions along the second lateral direction. The further sequence of lateral displacements may, for example, correspond to the sequence of lateral displacements along the first lateral direction. However, the corresponding cavity length variation profiles may differ from each other not only for different lateral displacements along the first lateral direction but also for different positions along the second lateral direction. This allows for a more effective compensation of spatial and/or temporal drifts.

According to several implementations, when the lateral motion and the variation of the cavity length during the time interval is finished, the actuator system is triggered to move the sample carrier and/or the at least one mirror of the pair of mirrors to effect the further lateral motion of the sample with respect to the optical cavity during the further time interval and the further variation of the cavity length during the further time interval according to the stored further description.

In particular, for each scanning line, a separate trigger signal may be used for triggering the actuator system.

According to several implementations, the triggering of the lateral motion and the variation of the cavity length during the time interval causes the actuator system to move the sample carrier and/or the at least one mirror of the pair of mirrors to effect the further lateral motion of the sample with respect to the optical cavity during the further time interval and the further variation of the cavity length during the further time interval according to the stored further description when the lateral motion and the variation of the cavity length during the time interval is finished.

In other words, a single trigger signal is used for effecting the lateral motion and cavity length variation as well as the further lateral motion and the further cavity length variation. In this way, the measurement speed may be even further increased.

According to several implementations, the sequence of lateral displacements comprises at least 30 different lateral displacements or at least 100 different lateral displacements or at least 1000 different lateral displacements.

For example, a total number of lateral displacements comprised by the sequence of lateral displacements may lie in the interval [30, 10000] or within the interval [100, 1000] or within the interval [200, 10000].

The same may hold analogously for the further sequence of lateral displacements and, if applicable, for all other scanning lines.

According to several implementations, a difference between a maximum lateral displacement of the sequence of lateral displacements and a minimum lateral displacement of the sequence of lateral displacements is at least 5° μm or at least 50° μm or at least 200° μm.

For example, the difference between the maximum lateral displacement and the minimum lateral displacement may be at most 500° μm or at most 5° mm.

In typical implementations, the number of different lateral displacements of the sequence of lateral displacements per length to be scanned lies in the interval [1/μm, 10/μm].

Therein, the length to be scanned is given by the difference between the maximum lateral displacement and the minimum lateral displacement.

According to several implementations, for each of the sequence of lateral displacements, the sensor dataset comprises respective data or data points for at least 10 different cavity lengths or at least 1000 different cavity lengths or at least 105 different cavity lengths or at least 107 different cavity lengths. For example, the number of cavity lengths may be the larger the narrower the bandwidth of the light source is.

For example, for each of the sequence of lateral displacements, the sensor dataset comprises respective data or data points for at most 108 different cavity lengths.

According to several implementations, for each of the sequence of lateral displacements, a difference between a maximum cavity length according to the variation of the cavity length and a minimum cavity length according to the variation of the cavity length is at most 1000° nm or at most 500° nm or at most 100° nm or at most 1° nm or at most 100° μm.

For example, the difference between the maximum cavity length and the minimum cavity length may be at least 1° nm.

According to several implementations, the number of data points per cavity length scan range lies within the interval [0.1/nm, $10^7$/nm].

The exact number of data points per cavity length scan range may depend significantly on the modulation width, consequently said range is rather large.

Therein, the cavity length scanning range is given by the difference between the maximum cavity length and the minimum cavity length.

A duration of the time interval is, for example, equal to or shorter than 101 μs, for example equal to or shorter than 500° ms, typically equal to or shorter than 200° ms, for example equal to or shorter than 100° ms. A minimum duration of the first time interval may for example be 10° ms.

According to several implementations, a quantity characterizing or affecting an absorption of the introduced light by the sample is determined in a spatially resolved manner depending on the sensor dataset, for example, with the evaluation circuit.

The quantity characterizing or affecting an absorption may for example be an absorption coefficient, an attenuation coefficient, an absorption cross section, an absorbance et cetera.

According to several implementations, a quantity characterizing or affecting a scattering of the introduced light by the sample is determined in a spatially resolved manner depending on the sensor dataset, for example, with the evaluation circuit.

According to several implementations, a quantity characterizing or affecting an extinction of the introduced light by the sample is determined in a spatially resolved manner depending on the sensor dataset, for example, with the evaluation circuit.

The extinction may be understood as a combined effect due to absorption and scattering. Depending on the structure of the sample, for example a particle size, scattering effects may be negligible or comparable to the absorption or even dominant.

According to several implementations, a quantity characterizing a concentration of a substance in the sample is determined in a spatially resolved manner depending on the sensor dataset, for example, with the evaluation circuit. The concentration may for example be derived from a respective absorption or extinction of the introduced light by the sample.

According to several implementations, a quantity characterizing a stimulated emission of the sample is determined in a spatially resolved manner depending on the sensor dataset, for example, with the evaluation circuit. The stimulated emission may for example be stimulated by the introduced light.

According to several implementations, a quantity characterizing fluorescent light emission of the sample is determined in a spatially resolved manner depending on the sensor dataset, for example, with the evaluation circuit. The fluorescence may for example be caused by the introduced light.

According to several implementations, a quantity characterizing a coupling strength between the sample and the introduced light is determined in a spatially resolved manner depending on the sensor dataset, for example, with the evaluation circuit.

A spatial resolution may be considered as a one-dimensional or two-dimensional spatial resolution in the first and/or second lateral direction. However, also a three-dimensional spatial resolution is possible as described above.

As a result of determining the quantity characterizing or affecting the absorption of the introduced light, in particular a one-dimensional graphical representation or a two-dimensional image representation or a two-dimensional map or a three-dimensional image representation or a three-dimensional map may be generated.

According to a further aspect of the disclosure, an optical sensor system for performing cavity enhanced microscopy of a sample, in particular by using a method for cavity enhanced microscopy according to the disclosure, is provided. The optical sensor system comprises a pair of opposing mirrors, which is designed and arrangeable to form an optical cavity, wherein a variable cavity length of the optical cavity is given by a variable distance between the pair of mirrors. The optical sensor system comprises a sample carrier, on which the sample is placeable, wherein the sample carrier is formed by one of the pair of mirrors or is arranged between the pair of mirrors. The optical sensor system comprises a storage device storing a description, which defines a lateral motion of the sample with respect to the optical cavity during a predefined time interval and a variation of the cavity length during the time interval in a temporally synchronized manner.

The optical sensor system comprises an actuator system, which is arranged and configured to change the distance between the pair of mirrors, in particular in order to vary the cavity length, and to move the sample carrier relative to the optical cavity laterally. The optical sensor system comprises a control circuit, which is configured to read the stored description from the storage device and to trigger the actuator system to move the sample carrier and/or at least one mirror of the pair of mirrors to effect the lateral motion of the sample relative to the optical cavity during the time interval and the variation of the cavity length during the time interval according to the stored description. The optical sensor system comprises a light source, which is arrangeable and configured to introduce light in the optical cavity during the lateral motion and the variation of the cavity length. The optical sensor system comprises at least one optical detector, which is arrangeable and configured to detect transmitted portions of the introduced light and/or reflected portions of the introduced light and/or scattered portions of the introduced light and/or portions of light emitted from the optical cavity in response to the introduced light. The optical sensor system comprises an evaluation circuit, which is configured to generate a sensor dataset depending on the detected transmitted portions and/or the detected reflected portions and/or the detected scattered portions and/or the detected portions of light emitted from the optical cavity.

The evaluation circuit and the control circuit may be implemented separately from each other, for example, by respective computing units. However, in alternative implementations, the control circuit may comprise the evaluation circuit or vice versa. In particular, a respective computing unit may comprise the control circuit and the evaluation circuit.

The actuator system comprises, in particular, at least one first actuator, which is coupled to the first mirror of the pair of mirrors and/or to the second mirror of the pair of mirrors, in order to change the distance between the mirrors to vary the cavity length. The actuator system further comprises at least one second actuator, which is coupled to at least one of the pair of mirrors and/or to the sample carrier to move the sample carrier relative to the optical cavity along the first and/or second lateral direction.

In particular, if the sample carrier corresponds to one of the pair of mirrors, in particular the second mirror, the at least one second actuator may move the first mirror while the second mirror is stationary or vice versa. On the other hand, if the sample carrier is implemented as a separate sample carrier, which is arranged between the first and the second mirror, the at least one second actuator may move the sample carrier, while the first and the second mirror remain stationary or may move the first and the second mirror, while the sample carrier remains stationary or may move the first mirror, while the sample carrier and the second mirror are stationary or may move the second mirror while the first mirror and the sample carrier remain stationary.

The actuator system may further comprise an actuator control circuit, which is configured to generate respective control signals for the at least one first actuator and/or the at least one second actuator to effect the movement of the sample carrier relative to the optical cavity and/or to change the distance between the pair of optical mirrors. In particular, the control circuit may comprise a clock generator for providing the trigger signal or may generate the trigger signal based on the clock generator or an output of the clock generator, in particular a clock signal of the clock generator. The control circuit may provide the single trigger signal to the actuator control signal to trigger the actuator system by generating the respective control signals accordingly.

The at least one first actuator and/or the at least one second actuator may, for example, be implemented as respective piezo actuators. In particular, the respective control signals may correspond to voltage signals, in particular time dependent control voltages, to control the respective actuators.

The actuator control circuit may, in some implementations, also be a part of the control circuit.

According to several implementations of the optical sensor system, the first mirror of the pair of mirrors comprises a first mirror surface and the second mirror of the pair of mirror comprises a second mirror surface opposing the first mirror surface, in particular when the optical cavity is formed.

According to several implementations, the first mirror surface is a concave mirror surface. For example, the first mirror surface is formed by an end facet of an optical fiber, in particular by an end facet of the optical fiber, which is coated by a reflective coating, and the second mirror surface is a planar mirror surface. The sample carrier is formed by the second mirror.

According to several implementations, the first mirror surface is a concave mirror surface, formed in particular by the end facet of the optical fiber, and the second mirror surface is a planar mirror surface, wherein the sample carrier is arranged between the first mirror surface and the second mirror surface and is, in particular, implemented as a separate sample carrier.

According to several implementations, the first mirror surface is formed by an end facet of a first optical fiber and is, in particular, concave, and the second mirror surface is formed by an end facet of a second optical fiber, and is, in particular, concave, wherein the sample carrier is arranged between the first mirror surface and the second mirror surface.

According to several implementations, the light source is arranged to couple light into the first optical fiber or into the second optical fiber to introduce the light into the optical cavity.

According to several implementations, the actuator system comprises at least one first actuator, which is coupled to the first mirror and/or to the second mirror and is configured to change the distance between the pair of mirrors, in particular when controlled accordingly by the actuator control circuit.

According to several implementations, the actuator system comprises at least one second actuator, which is coupled to the first mirror and/or to the second mirror and is configured to move the first mirror laterally relative to the second mirror, in particular in order to move the sample carrier relative to the optical cavity.

Such implementations are particularly beneficial in case the sample carrier is formed by the second mirror. However, also if the sample carrier is implemented as the separate sample carrier, such implementations may be used. In particular, if the first mirror surface is concave, the second mirror surface is planar, and the sample carrier is formed by the second mirror, the at least one second actuator may be configured and coupled to move the first mirror or the second mirror relatively to each other.

On the other hand, in case the first mirror surface is concave and the second mirror surface is planar and the sample carrier is implemented as the separate sample carrier arranged between the first and the second mirror, the at least one second actuator may be coupled to the first mirror, in particular to the first optical fiber, and configured to move the first mirror, while the sample carrier and the second mirror remain stationary.

For example, in case the first mirror surface is concave and the second mirror surface is also concave, in particular the first mirror is formed by the end facet of the first optical fiber and the second mirror is formed by the end facet of the second optical fiber, and the sample carrier is implemented as the separate sample carrier, the at least one second actuator may be coupled to the first mirror and to the second mirror, in particular to the first optical fiber and to the second optical fiber, and configured to move the first mirror and the second mirror together, while the sample carrier remains stationary.

In alternative implementations, the actuator system comprises at least one third actuator, which is coupled to the sample carrier and is configured to move the sample carrier relative to the optical cavity. The at least one third actuator may be provided instead of or in addition to the at least one second actuator.

According to several implementations, the second mirror surface is planar, and the second mirror comprises a Bragg reflector.

Further implementations of the optical sensor system according to the disclosure follow directly from the various embodiments of the method according to the disclosure and vice versa. In particular, individual features and corresponding explanations relating to the various implementations of the method according to the disclosure can be transferred analogously to corresponding implementations of the optical sensor system according to the disclosure. In particular, the optical sensor system according to the disclosure is designed or programmed to carry out the method according to the disclosure. In particular, the optical sensor system according to the disclosure carries out the method according to the disclosure.

In particular, the evaluation circuit and/or the control circuit and/or the actuator control circuit may be implemented as one or more computing units, respectively, or may be comprised by one or more computing units, respectively. A computing unit, which may also be denoted as computing circuit, may in particular be understood as a data processing device, which comprises processing circuitry. The computing unit can therefore in particular process data to perform computing operations. This may also include operations to perform indexed accesses to a data structure, for example a look-up table, LUT.

In particular, the computing unit may include one or more computers, one or more microcontrollers, and/or one or more integrated circuits, for example, one or more application-specific integrated circuits, ASIC, one or more field-programmable gate arrays, FPGA, and/or one or more systems on a chip, SoC. The computing unit may also include one or more processors, for example one or more microprocessors, one or more central processing units, CPU, one or more graphics processing units, GPU, and/or one or more signal processors, in particular one or more digital signal processors, DSP. The computing unit may also include a physical or a virtual cluster of computers or other of said units.

In various embodiments, the computing unit includes one or more hardware and/or software interfaces and/or one or more memory units.

A memory unit, also denoted as storage device or storage circuit, may be implemented as a volatile data memory, for example a dynamic random access memory, DRAM, or a static random access memory, SRAM, or as a non-volatile data memory, for example a read-only memory, ROM, a programmable read-only memory, PROM, an erasable programmable read-only memory, EPROM, an electrically erasable programmable read-only memory, EEPROM, a flash memory or flash EEPROM, a ferroelectric random access memory, FRAM, a magnetoresistive random access memory, MRAM, or a phase-change random access memory, PCRAM.

If it is mentioned in the present disclosure that a component of the optical sensor system according to the disclosure, in particular the control circuit or the evaluation circuit or a computing unit of the optical sensor system, is adapted, configured or designed to, et cetera, to perform or realize a certain function, to achieve a certain effect or to serve a certain purpose, this can be understood such that the component, beyond being usable or suitable for this function, effect or purpose in principle or theoretically, is concretely and actually capable of executing or realizing the function, achieving the effect or serving the purpose by a corresponding adaptation, programming, physical design and so on.

Further features of the disclosure are apparent from the claims, the figures and the figure description. The features and combinations of features mentioned above in the description as well as the features and combinations of features mentioned below in the description of figures and/or shown in the figures may be comprised by the disclosure not only in the respective combination stated, but also in other combinations. In particular, embodiments and combinations of features, which do not have all the features of an originally formulated claim, may also be comprised by the disclosure. Moreover, embodiments and combinations of features which go beyond or deviate from the combinations of features set forth in the recitations of the claims may be comprised by the disclosure.

In the following, the disclosure will be explained in detail with reference to specific exemplary implementations and respective schematic drawings. In the drawings, identical or functionally identical elements may be denoted by the same reference signs. The description of identical or functionally identical elements is not necessarily repeated with respect to different figures.

BRIEF DESCRIPTION OF THE DRAWINGS

The disclosure will now be described with reference to the drawings wherein.

DESCRIPTION OF EXEMPLARY EMBODIMENTS

Figure 1:
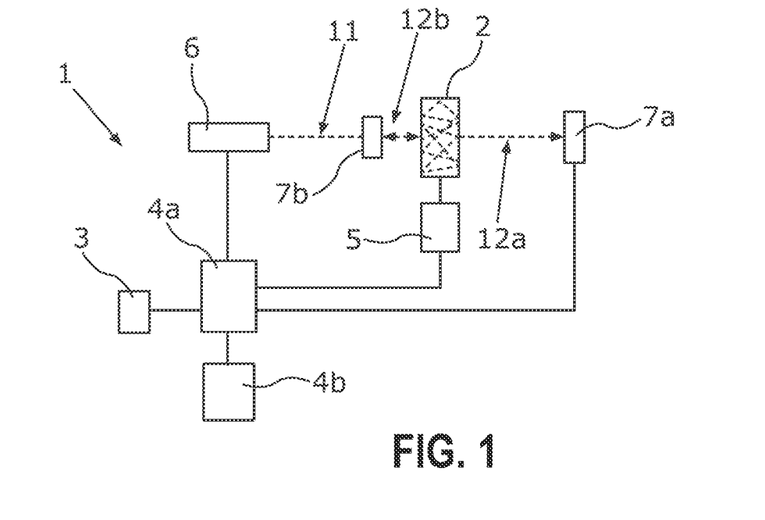
FIG. 1 shows a schematic block diagram of an exemplary implementation of an optical sensor system according to the disclosure.

FIG. 1 shows schematically an exemplary implementation of an optical sensor system 1 for performing cavity enhanced microscopy of a sample. The optical sensor system 1 comprises a pair of opposing mirrors, which is arrangeable to form an optical cavity 2. A variable length of the optical cavity 2 is given by a variable distance between the pair of mirrors.

Figure 2:
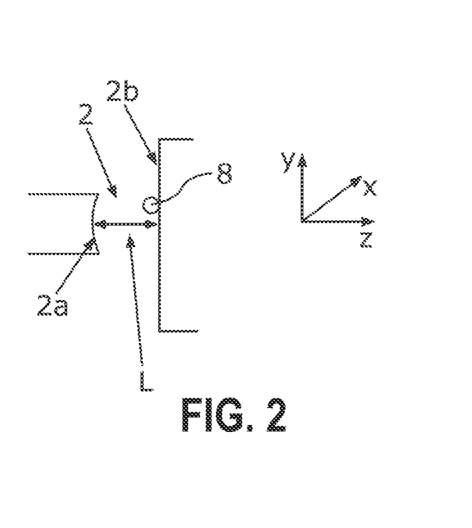
FIG. 2 shows a schematic representation of an optical cavity according to a further exemplary implementation of an optical sensor system according to the disclosure.
Figure 3:
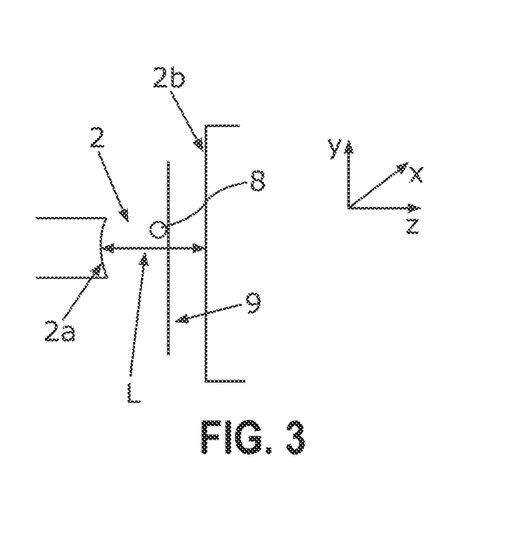
FIG. 3 shows a schematic representation of an optical cavity of a further exemplary implementation of an optical sensor system according to the disclosure.

FIG. 2 and FIG. 3 show schematically possible implementations of the optical cavity 2 for use in an optical sensor system 1 as shown in FIG. 1. The optical cavity 2 of FIG. 2 is formed by a macroscopic planar mirror 2b and an opposing microscopic concave mirror 2a formed, for example by an end facet of an optical fiber. The cavity length L is given by the distance between the planar mirror 2b and the center of the concave mirror 2a. In this implementation, the second mirror 2b acts as a sample carrier on which the sample 8 may be placed.

In the implementation of FIG. 3, a separate sample carrier 9 is provided between the mirrors 2a, 2b to freely suspend the sample 8 between the mirrors 2a, 2b.

It is noted that, however, also a combination of two planar mirrors or two concave mirrors may be used to form the optical cavity 2, for example by using two opposing optical fibers with respective end facets and the separate sample carrier 9 in between them.

Referring again to FIG. 1, the optical sensor system 1 further comprises a storage device 3 storing a description, which defines a lateral motion of the sample 8 relative to the optical cavity 2 during a predefined time interval as well as a variation of the cavity length L during the time interval in a temporally synchronized manner. Furthermore, the optical sensor system 1 comprises an actuator system 5, which is arranged and configured to change the distance between the pair of mirrors 2a, 2b in order to vary the cavity length L and to move the sample carrier, in particular the second mirror 2b or the separate sample carrier 9, relative to the optical cavity 2 laterally.

For example, the actuator system 5 comprises at least one first actuator coupled to the first mirror 2a or to the second mirror 2b or both to move them relative to each other along the longitudinal direction z, which is the direction defining the cavity length L. Furthermore, the actuator system 5 may comprise at least one second actuator coupled to the second mirror 2b or to the first mirror 2a or the sample carrier, in particular the second mirror 2b or the separate sample carrier 9, to effect the lateral motion of the sample 8 relative to the optical cavity 2 along a first lateral direction x, which is perpendicular to the longitudinal direction z, and, optionally, along a second lateral direction y, which is perpendicular to the longitudinal direction z and, in particular, perpendicular to the first lateral direction x.

The optical sensor system 1 further comprises a control circuit 4a, which is connected to the storage device 3 or comprises the storage device 3 and is configured to read out the description from the storage device 3. The control circuit 4a is configured to generate a single trigger signal to trigger the actuator system 5 to move the sample carrier, in particular the second mirror 2b or the separate sample carrier 9, and/or at least one of the pair of mirrors 2a, 2b to effect the lateral motion of the sample 8 relative to the optical cavity during the time interval and the variation of the cavity length L during the time interval according to the stored description.

For example, a driver circuit of the actuator system 5 may receive the trigger signal from the control circuit 4a, which causes the driver circuit to provide the respective drive voltages or drive currents to the at least one first actuator and/or the at least one second actuator necessary to realize the lateral motion and the variation of the cavity length L according to the stored description at each respective clock-cycle.

It is noted that the control circuit 4a may also be integrated or partly integrated with the actuator system 5. In other words, the control circuit 4a may contain the actuator system 5 or parts of it, for example the driver circuit, or the actuator system 5 may contain the control circuit 4a or parts of it.

The optical sensor system 1 further comprises a light source 6, in particular a laser light source, for example a narrow band laser light source with a wavelength of 780 nm, or a white light source or an LED or an SLED, which is arrangeable and configured to introduce light 11 into the optical cavity 2 during the lateral motion and the variation of the cavity length L. The optical sensor system 1 comprises an optical detector 7a, which is arrangeable and configured to detect transmitted portions 12a of the introduced light 11 and/or an optical detector 7b, which is arrangeable and configured to detect reflected portions 12b of the introduced light 11.

In some implementations, the optical sensor system 1 comprises a further optical detector arranged next to the optical cavity 2 in order to detect scattered portions of the light and/or portions of light being emitted by the optical cavity 2 in response to the introduced light 11, such as fluorescent light or light stemming from stimulated emission.

Furthermore, the optical sensor system 1, for example the control circuit 4a, comprises an evaluation circuit 4b, which is configured to generate a sensor dataset depending on the detected transmitted portions 12a and/or the detected reflected portions 12b and/or the detected scattered portions and/or the detected portions of light emitted from the optical cavity.

Figure 4:
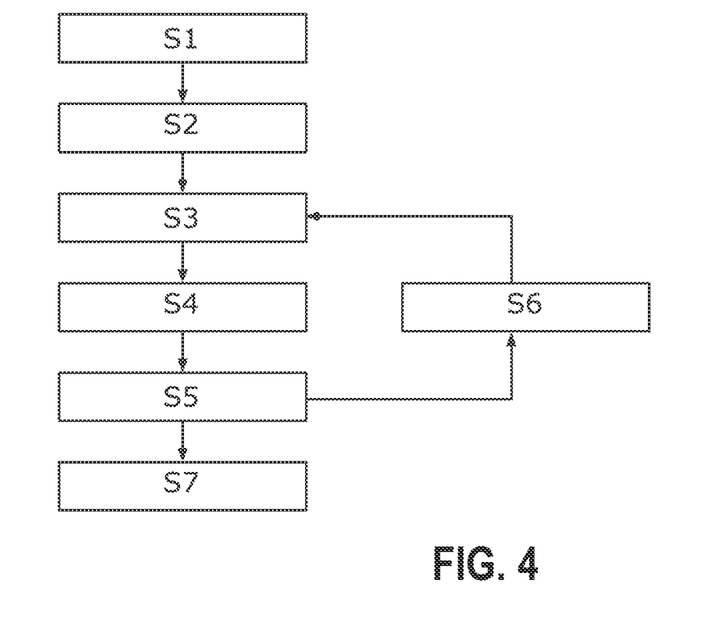
FIG. 4 shows a flow diagram of an exemplary implementation of a method according to the disclosure.

FIG. 4 shows a flow diagram of an exemplary implementation of a method according to the disclosure for performing cavity enhanced microscopy of a sample 8, in particular by using an optical sensor system 1 according to the disclosure, as for example shown in FIG. 1 to FIG. 3.

In step S1, the optical cavity 2 is formed by placing the opposing mirrors 2a, 2b accordingly, and then sample 8 is arranged on the sample carrier, or the sample 8 is first arranged on the sample carrier and then the optical cavity 2 is formed by placing the opposing mirrors 2a, 2b accordingly. In step S2, the respective description defining the lateral motion of the sample 8 relative to the optical cavity 2 and the variation of the cavity length L for a given position in the second lateral direction y and a corresponding variation of the cavity length L during the time interval for scanning a respective line in the first lateral direction x in a temporally synchronized manner is stored to the storage device 3. This may be repeated for a plurality of different positions in the second lateral direction y or, in other words, lines. In other words, for each line to be scanned in the first lateral direction x, that is for each of the plurality of positions in the second lateral direction y, a corresponding description is stored, which defines the variation of the cavity length L for the various positions in the first lateral direction x.

In step S3, the optical cavity 2 is tuned to one of the lines to be scanned by setting the respective position in the second lateral direction y. The actuator system 5 is triggered to move the sample carrier and/or at least one mirror of the pair of mirrors 2a, 2b to effect the lateral motion of the sample 8 relative to the optical cavity 2 and the variation of the cavity length L during the time interval according to the stored description for the line to be scanned.

In step S4, the transmitted portions 12a and/or the reflected portions 12b and/or the scattered portions and/or emitted portions are detected. In step S5, the sensor dataset is generated depending on the detected transmitted portions 12a and/or the detected reflected portions 12b and/or the detected scattered portions and/or the detected emitted portions for the scanned line. For generating the sensor dataset, the stored description is taken into account to associate each measurement with the corresponding position in the first and second lateral directions x, y as well as the corresponding cavity length L. In step S6, the position in the second lateral direction is changed, and the steps S3 to S6 are repeated until all lines have been scanned.

In step S7, after the respective sensor datasets have been generated for all scanned lines, a two-dimensional image of a quantity characterizing the absorption of the light 11 due to the sample 8 may be generated, in particular by the evaluation circuit 4b. Alternatively, the two-dimensional image may be generated line-wise, such that a line of the two-dimensional image is generated when the corresponding sensor dataset has been generated.

Figure 5:
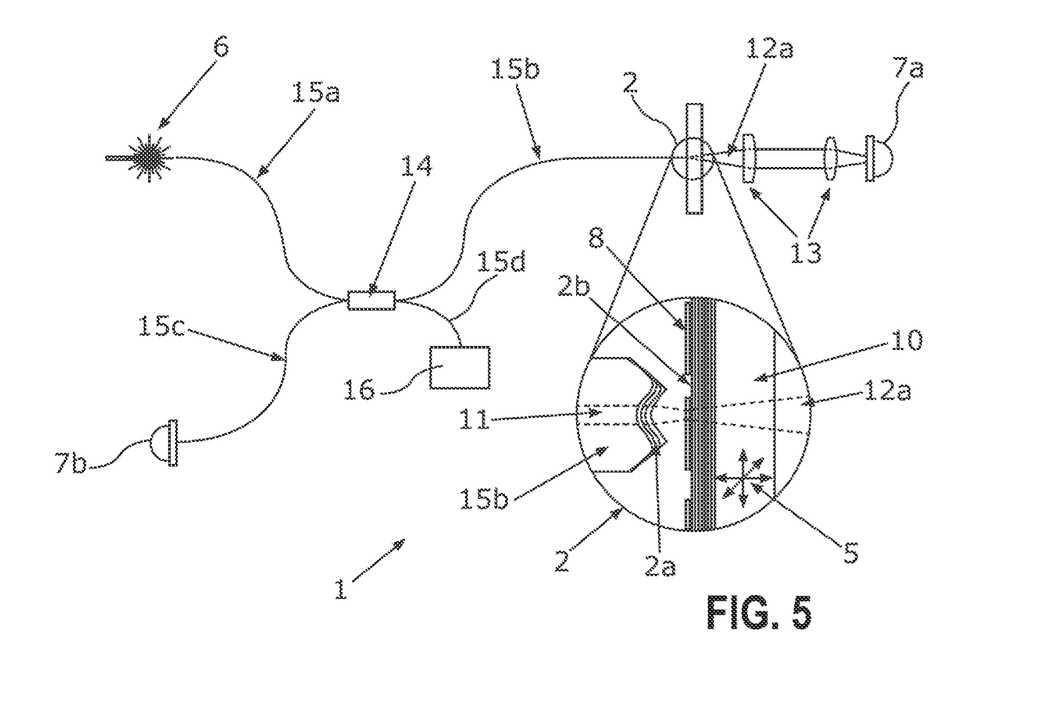
FIG. 5 shows a schematic representation of a further exemplary implementation of an optical sensor system according to the disclosure.

In FIG. 5, a further exemplary implementation of an optical sensor system 1 according to the disclosure is shown, wherein the storage device 3, the control circuit 4a and the evaluation circuit are not shown for convenience only.

In this implementation, the optical cavity 2 is for example formed by the planar second mirror 2b, which comprises for example a substrate 10 and a Bragg reflector structure or reflecting coating on top of the substrate 10, in combination with the first mirror 2a, which is formed by the end facet of the first optical fiber 15b. In particular, also the end facet of the optical fiber 15b may comprise a corresponding highly reflective coating.

The light source 6 may couple the light into an optical fiber 15a, which is connected to a beam splitter 14. Furthermore, the optical fiber 15b, whose end facet forms the first mirror 2a, is also connected to the beam splitter 14 as well as two further optical fibers 15c, 15d. The optical fiber 15d may, for example, end at a blocking device 16. It is noted that in other implementations, the beam splitter 14 and/or the blocking device 16 may not be required.

When the light is emitted into the optical fiber 15a by the light source 6, the beam splitter 14 couples at least a part of the light into the optical fiber 15b in order to introduced the light 11 into the optical cavity 2. Reflected portions of the light 11 may propagate back through the optical fiber 15b and may be guided by the beam splitter 14 via the optical fiber 15c to the optical detector 7b. On the other hand, the transmitted portions 12a passing the second mirror 2b may be detected by the correspondingly arranged detector optical 7a. For example, optical means 13 may be provided between the second mirror 2b and the optical detector 7a, for example, for beam forming of the transmitted portions 12a.

It is pointed out that the optical fiber 15d and the blocking device are optional. Furthermore, the optical sensor system 1 may, in some cases, comprise the optical detector 7a and the optical detector 7b, while in other implementations it comprises only one of the optical detectors 7a, 7b. In case the optical sensor system 1 does not comprise the optical detector 7b, also the optical fiber 15c may end at a corresponding blocking device or may be omitted together with the beam splitter 14.

According to the implementation of FIG. 5, the optical cavity 2, which is in particular an optical micro-cavity, may be equipped with independent actuators, for example piezo actuators, of the actuator system 5 that allow to move the two mirrors 2a, 2b, for example in all three spatial dimensions x, y, z with respect to each other. Due to the presence of a depression causing the concave surface of the microscopic first mirror 2a, the light field inside the resonator, that is a respective cavity mode, interacts only with a localized area of the planar second mirror 2b, which is, in particular, where the sample 8 is placed. The interaction area is for example determined by the lateral size of the cavity mode. By moving the two mirrors 2a, 2b laterally with respect to each other, different spots on the sample 8 may be probed by the cavity mode. The size of the mode at the position of the sample 8 may determine the spatial resolution when probing the sample 8.

By moving the two mirrors 2a, 2b longitudinally with respect to each other, a sweep of the cavity resonances over the wavelength of the light source 6 may be performed. For example, a two-dimensional map of the sample 8 may be acquired by probing a rectangular array of M by N points with the cavity mode. To achieve this, a number of N displacements, for example regular or equally spaced displacements, is chosen along the second lateral direction y and addressed in sequence.

For each displacement in y, a sample displacement in M steps along the orthogonal first lateral direction x, the longitudinal sweeping of the cavity mirror distance in longitudinal direction z or, in other words, the cavity length L, and the detection of the optical transmission and/or reflection signal by the respective optical detectors 7a, 7b are synchronized. In this manner, a two-dimensional map of the sample 8 may be generated in a line-by-line fashion, where for each displacement in y, a dataset comprising transmission and/or reflection data for a fixed number of steps or displacements in x direction is acquired for example in one single step.

Figure 7A:
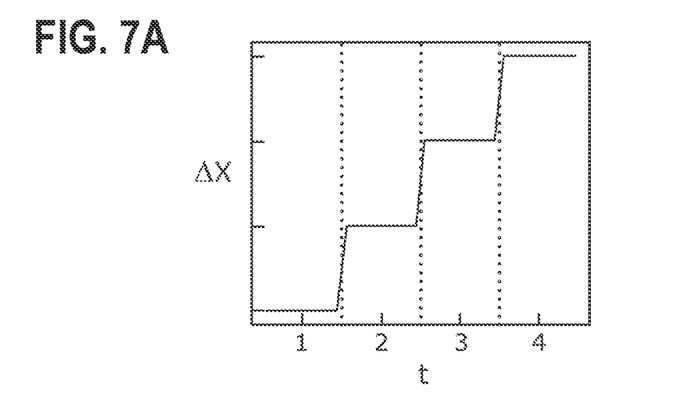
FIGS. 7A, 7B, and 7C show exemplary lateral motion profiles and cavity length variation profiles as well as corresponding transmission curves for a further exemplary implementation of a method according to the disclosure.
Figure 7B:
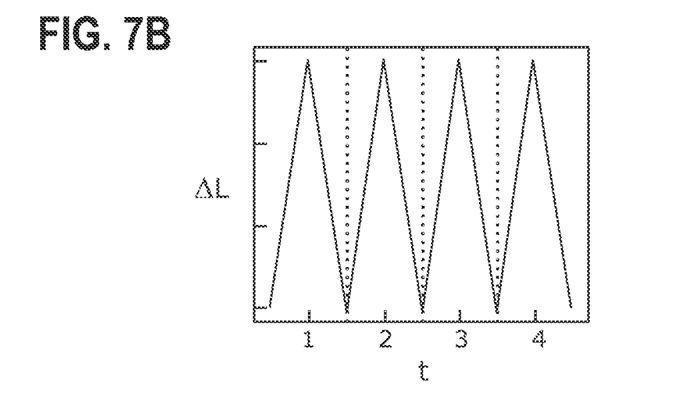

For this purpose, precomputed displacement signals for the respective x- and z-actuators of the actuator system 5 are prepared and stored in terms of said description. For instance, these precomputed signals may take the form of a step-like function for x, such that the position in x direction given by a corresponding displacement Δx remains constant for certain time intervals and then rapidly moves to the next position, as shown in FIG. 7A schematically, while the signal for z might be a series of triangular impulses such that the mirror separation distance is linearly increased and decreased periodically leading to a corresponding change ΔL in the cavity length L, as shown in FIG. 7B schematically. In order to achieve a synchronization between x and z, an equal number M of steps and triangles may be chosen such that for each fixed position in x, the z coordinate performs one linear increase and one linear decrease, before x moves to the next fixed position. For more complex scenarios, other precomputed signals for x and z may be chosen.

In particular, the signal for z may include an additional displacement that is dependent on the current position in x and y direction, in order to correct for a position-dependent offset in the cavity length L. Such correction displacements may either be precomputed or be automatically generated by a feedback mechanism, or a combination of both.

The two precomputed signals are then sent to the x and z actuators over a predetermined time interval, while the output of the respective optical detectors 7a, 7b is recorded over the same time interval with a predetermined number of datapoints. After recording has finished, the stored detector signal is decomposed into M individual datasets that each correspond to one of the M selected points along x direction. This decomposition may be based on the known timings of the precomputed displacement or other suitable means. For the exemplary x and z signals discussed above, each of the M individual datasets would correspond to a fixed displacement in x direction and a full triangular sweep in z direction. Also other shapes apart from triangular may be used, such as sinusoidal sweeps and the like. Since the optical cavity 2 is supposedly resonant with the incoming light 11 at some point during each z sweep, each of the M datasets may comprise one or more cavity resonances.

Figure 6A:
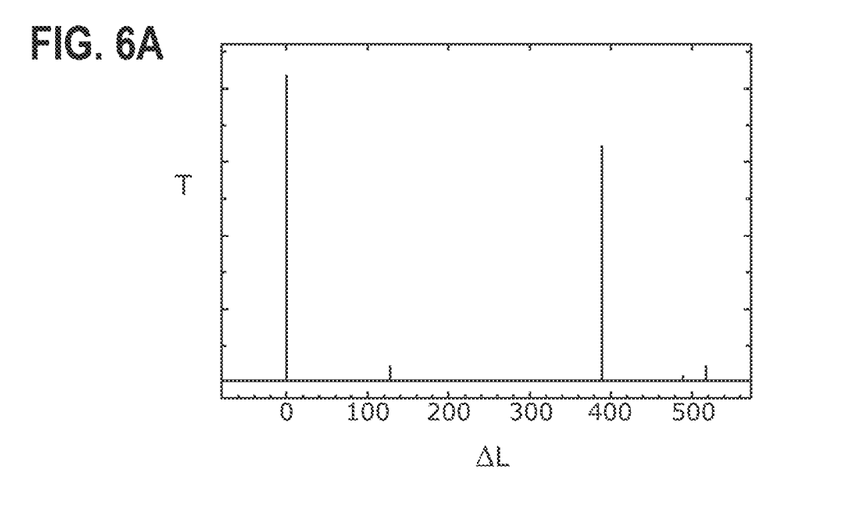
FIGS. 6A and 6B show schematically transmission curves according to a further exemplary implementation of a method according to the disclosure.
Figure 6B:
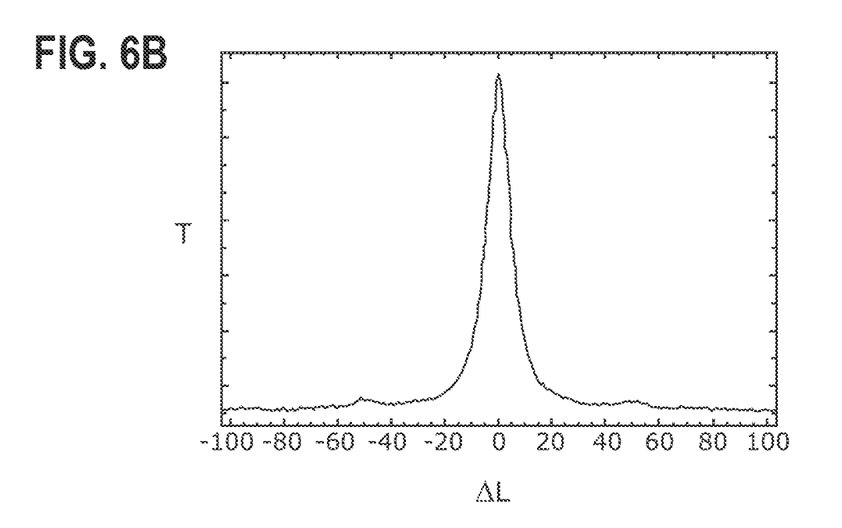
Figure 7C:
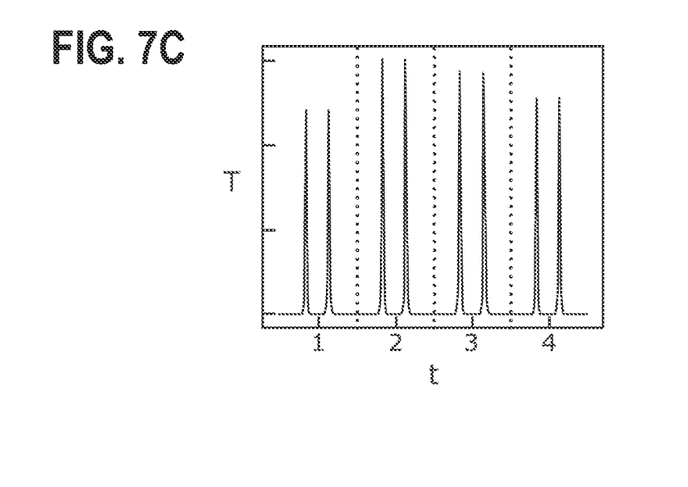

Depending on whether transmission through and/or reflection from the optical cavity 2 was recorded by the respective detectors 7a, 7b, these cavity resonances may give rise to peaks and/or dips in the datasets, as shown in FIG. 7B schematically for the case of peaks in the transmission T. Analogously, the cavity resonances may lead to respective features in the scattered light or the light emitted from the optical cavity 2 in response to the introduced light. FIG. 7C shows schematically the temporal course of the transmission T assuming that a cavity mode is resonant for each sweep in z direction. FIG. 6A shows respective data for the transmission T acquired in an experiment, wherein the change ΔL in the cavity length L runs from approximately −100 nm to approximately 600 nm. FIG. 6B show a detail of FIG. 6A for ΔL from −100 nm to 100 nm.

One line of M points in a two-dimensional map of the sample 8 may then be derived from the characteristics of the signal detected from the optical cavity 2 in each of the M datasets. To this end, different characteristics of the cavity resonances may be computed, amongst others peak height, peak width, peak position, or peak shape. By repeating this procedure N times for different displacements along the y direction, a rectangular map of M by N points is generated in a line-by-line fashion.

To allow for a particularly fast sweeping over the sample 8, a high measurement frequency of the optical detectors 7a, 7b may be chosen in order to properly resolve the supposedly narrow cavity resonances and to derive reliable values for said characteristics. In fact, the number of datapoints read from the optical detectors 7a, 7b per time may be so large that the measurement speed could in principle be limited by the data transfer rate to a computer or a similar controlling device. To allow for a fast sweeping where the number of recordable datapoints per time is not limited by such transfer rates, a downsampling of the recorded signals may be combined with the high measurement frequency of the optical detectors 7a, 7b. For example, the evaluation circuit 4b may pass a reduced dataset to a computer or a similar controlling device to perform further data analysis, in particular to derive said characteristics of the individual cavity resonance characteristics. In principle, such downsampling may alter said characteristics of peaks in the data. For this reason, adapted downsampling mechanisms may be chosen that are intended to preserve the characteristics of interest.

In a complementary approach, the precomputed z displacement signal may be chosen in a way to incorporate systematic spatial or temporal drifts of the cavity resonances in order to allow sweeping only over a narrow interval around a specific cavity resonance. This compensation offset may for example be chosen globally based on known behavior of the resonator or may be automatically derived from an initial measurement without any applied compensation. In this manner, the combination of a precomputed z displacement signal with a known offset compensation would allow to keep the cavity resonance reliably within the chosen interval while at the same time reducing the number of recorded datapoints and may suffice to remove the need for downsampling methods.

The disclosure may be used in a multitude of variations, including but not limited to the following:

Only the transmitted portions 12a but not the reflected portions 12b may be detected and/or evaluated or vice versa.

A synchronized measurement, where the microscopic first mirror 2a is moved in all three spatial dimensions x, y, z, while the macroscopic second mirror 2b remains fixed may be carried out.

A synchronized measurement, where the macroscopic second mirror 2b is moved in all three spatial dimensions x, y, z, while the microscopic first mirror 2a remains fixed may be carried out.

A synchronized measurement, where both the macroscopic second mirror 2b and the microscopic first mirror 2a are moved in different spatial directions may be carried out.

A synchronized measurement, where the sample 8 is suspended inside the optical cavity 2 with the separate sample carrier 9 and translated laterally independent of the positions of the mirrors 2a, 2b may be carried out.

A measurement of the transmission and/or reflectance signal, where the transmission peak height at each sample position is employed to generate two-dimensional maps of the sample 8 may be carried out.

A measurement of the transmission and/or reflectance signal, where the transmission peak width at each sample position is employed to generate two-dimensional maps of the sample 8 may be carried out.

A measurement of the transmission and/or reflectance signal where the transmission peak position within the sweep range is employed to generate two-dimensional maps of the sample 8 may be carried out.

A measurement of the transmission and/or reflectance signal, where the transmission peak shape at each sample position is employed to generate two-dimensional maps of the sample 8 may be carried out.

A measurement of the optical signal, where the light is detected by a silicon photon multiplier or an avalanche photodiode as an optical detector 7a, 7b may be carried out.

Further advantages of the disclosure or individual implementations of the disclosure include a reduced measurement time due to the synchronized movement and recording of data for multiple points on the sample. The precomputation of displacement signals, the automatic decomposition of the signal from the optical detectors, and the optional downsampling of data or narrowing of the sweep interval significantly reduce delay times when communicating with a computer or other controlling equipment. As a result, the measurement speed is significantly increased compared to an approach where displacements and data acquisition would be triggered for each point of a map instead of each line or slice of a map.

Recording multiple points of a sample in one step in a predetermined manner allows to avoid detrimental effects during scanning. For example, cavity length variations due to slight mirror misalignments or cavity length variation through resonant excitation of actuator vibrations can be recorded once and then be pre-compensated to perform the displacements in a way that is optimal for the measurement.

Furthermore, no additional stabilization mechanisms like a secondary laser or a monolithic cavity are required. While the use of a secondary laser would increase the operational complexity, monolithic cavities would have to be stabilized by using a sturdy mechanical design, which, however, inhibits a flexible use, for example for investigating transmission resonances at different wavelengths.

In contrast to confocal microscopy, which is based on a single pass of light through the sample, the advantages of cavity enhancement are exploited by the disclosure. Microscopy techniques like a scanning nearfield optical microscopy may require the operation of an atomic force microscope, while the disclosure allows to realize a sensitivity enhancement by purely optical means.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS 1 optical sensor system
2 optical cavity
2a, 2b mirrors
3 storage device
4a control circuit
4b evaluation circuit
5 actuator system
6 light source
7a, 7b optical detectors
8 sample
9 separate sample carrier
10 substrate
11 introduced light
12a transmitted portions
12b reflected portions
13 optical means
14 beam splitter
15b, 15c, 15d optical fibers
16 blocking device
L cavity length
x, y lateral directions
z longitudinal direction
S1, S2, S3, S4, S5, S6, S7 method steps

What is claimed is:

1. A method for performing cavity enhanced microscopy of a sample, the method comprising:
arranging the sample in an optical cavity, which is formed by a pair of opposing mirrors and which has a variable cavity length, and which is given by a distance between the pair of mirrors, wherein the sample is placed on a sample carrier, which is formed by one of the pair of mirrors or is arranged between the pair of mirrors;
storing a description defining a lateral motion of the sample relative to the optical cavity during a predefined time interval and a variation of the cavity length during the time interval in a temporally synchronized manner;
effecting the entire lateral motion of the sample relative to the optical cavity during the time interval and the entire variation of the cavity length during the time interval according to the stored description by triggering an actuator system to move the sample carrier and/or at least one mirror of the pair of mirrors by generating a single trigger signal;
introducing light into the optical cavity during the lateral motion of the sample and the variation of the cavity length;
detecting transmitted portions of the introduced light and/or reflected portions of the introduced light and/or scattered portions of the introduced light and/or portions of light emitted from the optical cavity in response to the introduced light; and
generating a sensor dataset depending on the detected transmitted portions and/or the detected reflected portions and/or the detected scattered portions and/or the detected portions of light emitted from the optical cavity.

2. The method according to claim 1, wherein the variation of the cavity length is effected by varying the distance between the pair of mirrors along a longitudinal direction of the optical cavity.

3. The method according to claim 2, wherein the lateral motion of the sample relative to the optical cavity is defined by a predefined sequence of lateral displacements of the sample carrier along a first lateral direction, which is perpendicular to the longitudinal direction of the optical cavity, and
wherein the description comprises the sequence of lateral displacements.

4. The method according to claim 3, wherein the description comprises a respective temporal cavity length variation profile for each of the lateral displacements, and
wherein each of the lateral displacements is set consecutively according to the predefined sequence and, for each of the lateral displacements, the cavity length is varied according to the respective cavity length variation profile.

5. The method according to claim 4, wherein a first cavity length variation profile associated to a first lateral displacement of the sequence of lateral displacements differs from a second cavity length variation profile associated to a second lateral displacement of the sequence of lateral displacements.

6. The method according to claim 3, wherein:
the lateral motion of the sample relative to the optical cavity is defined by the sequence of lateral displacements of the sample carrier relative to the lateral center of the optical cavity along the first lateral direction at a predefined first position of the sample carrier relative to the lateral center of the optical cavity along a second lateral direction, which is perpendicular to the longitudinal direction of the optical cavity,
a further description defining a further lateral motion of the sample relative to the optical cavity during a predefined further time interval and a further variation of the cavity length during the further time interval in a temporally synchronized manner is stored, and
the further lateral motion of the sample relative to the optical cavity is defined by a predefined further sequence of lateral displacements of the sample carrier along the first lateral direction at a predefined second position of the sample carrier relative to the lateral center of the optical cavity along the second lateral direction.

7. The method according to claim 6, wherein:
when the lateral motion and the variation of the cavity length during the time interval is finished, the actuator system is triggered to move the sample carrier and/or the at least one mirror of the pair of mirrors to effect the further lateral motion of the sample relative to the optical cavity during the further time interval and the further variation of the cavity length during the further time interval according to the stored further description, or
the triggering of the lateral motion and the variation of the cavity length during the time interval causes the actuator system to move the sample carrier and/or the at least one mirror of the pair of mirrors to effect the further lateral motion of the sample relative to the optical cavity during the further time interval and the further variation of the cavity length during the further time interval according to the stored further description when the lateral motion and the variation of the cavity length during the time interval is finished.

8. The method according to claim 3, wherein
the sequence of lateral displacements comprises at least 30 different lateral displacements or at least 100 different lateral displacements or at least 1000 different lateral displacements, and/or
a difference between a maximum lateral displacement of the sequence of lateral displacements and a minimum lateral displacement of the sequence of lateral displacements is at least 5 µm or at least 50 µm or at least 200 µm, and/or
for each of the sequence of lateral displacements, the sensor dataset comprises respective data for at least 10 different cavity lengths or at least 1000 different cavity lengths or at least 107 different cavity lengths, and/or
for each of the sequence of lateral displacements, a difference between a maximum cavity length and a minimum cavity length according to the variation of the cavity length is at most 1000 nm or at most 500 nm or at most 100 nm or at most 1 nm or at most 100 pm.

9. The method according to claim 1, wherein:
a quantity characterizing or affecting an absorption and/or scattering and/or extinction of the introduced light by the sample is determined in a spatially resolved manner depending on the sensor dataset, and/or
a quantity characterizing a concentration of a substance in the sample is determined in a spatially resolved manner depending on the sensor dataset, and/or
a quantity characterizing a stimulated emission of the sample and/or fluorescent light emission of the sample is determined in a spatially resolved manner depending on the sensor dataset, and/or
a quantity characterizing a coupling strength between the sample and the introduced light is determined in a spatially resolved manner depending on the sensor dataset.

10. The method according to claim 1, wherein the actuator system comprises an actuator control circuit coupled to all actuators of the actuator system, and
wherein respective control signals are generated and provided automatically to the respective actuators by the actuator control circuit to effect the lateral motion and the variation of the cavity length.

11. The method according to claim 10, wherein the description stores a description of all required control signals directly or indirectly,
wherein the single trigger signal is provided to the actuator control circuit, and
wherein, in response to the single trigger signal, the actuator control circuit generates the control signals as stored in the description and provides them to the actuators.

12. An optical sensor system for performing cavity enhanced microscopy of a sample, the optical sensor system comprising:
a pair of opposing mirrors, which is arrangeable to form an optical cavity, wherein a variable cavity length of the optical cavity is given by a variable distance between the pair of mirrors;
a sample carrier on which the sample is placeable, wherein the sample carrier is formed by one of the pair of mirrors or is arranged between the pair of mirrors;
a storage device storing a description, which defines a lateral motion of the sample relative to the optical cavity during a predefined time interval and a variation of the cavity length during the time interval in a temporally synchronized manner;
an actuator system, which is arranged and configured to change the distance between the pair of mirrors and to move the sample carrier relative to the optical cavity laterally;
a control circuit, which is configured to effect the entire lateral motion of the sample relative to the optical cavity during the time interval and the entire variation of the cavity length during the time interval according to the stored description by triggering the actuator system to move the sample carrier and/or at least one mirror of the pair of mirrors by generating a single trigger signal;
a light source, which is arrangeable and configured to introduce light into the optical cavity during the lateral motion of the sample and the variation of the cavity length;
at least one optical detector, which is arrangeable and configured to detect transmitted portions of the introduced light and/or reflected portions of the introduced light and/or scattered portions of the introduced light and/or portions of light emitted from the optical cavity in response to the introduced light; and
an evaluation circuit, which is configured to generate a sensor dataset depending on the detected transmitted portions and/or the detected reflected portions and/or the detected scattered portions and/or the detected portions of light emitted from the optical cavity.

13. The optical sensor system according to claim 12, wherein a first mirror of the pair of mirrors comprises a first mirror surface and a second mirror of the pair of mirror comprises a second mirror surface opposing the first mirror surface, and
wherein the first mirror surface is a concave mirror surface and the second mirror surface is a planar mirror surface, wherein the sample carrier is formed by the second mirror, or
wherein the first mirror surface is a concave mirror surface and the second mirror surface is a planar mirror surface, wherein the sample carrier is arranged between the first mirror surface and the second mirror surface or the sample carrier is arranged on the second mirror surface, or
the first mirror surface is a concave mirror surface and the second mirror surface is a concave mirror surface, wherein the sample carrier is arranged between the first mirror surface and the second mirror surface.

14. The optical sensor system according to claim 13, wherein the first mirror surface is formed by an end facet of a first optical fiber.

15. The optical sensor system according to claim 14, wherein the light source is arranged to couple light into the first optical fiber to introduce the light into the optical cavity.

16. The optical sensor system according to claim 13, wherein a radius of curvature of the first mirror surface is at most 100 µm, typically at most 50 µm.

17. The optical sensor system according to claim 12, wherein the first mirror surface is formed by an end facet of a first optical fiber and the second mirror surface is formed by an end facet of a second optical fiber, and
wherein the sample carrier is arranged between the first mirror surface and the second mirror surface.

18. The optical sensor system according to claim 12, wherein:
- the actuator system comprises at least one first actuator, which is coupled to the first mirror and/or to the second mirror and is configured to change the distance between the pair of mirrors, and/or
- the actuator system comprises at least one second actuator, which is coupled to the first mirror and/or the second mirror and is configured to move the first mirror laterally relative to the second mirror or the actuator system comprises at least one third actuator, which is coupled to the sample carrier and is configured to move the sample carrier relative to the optical cavity.

19. The optical sensor system according to claim 12, wherein the actuator system comprises an actuator control circuit coupled to all actuators of the actuator system, and
- wherein respective control signals are generated and provided automatically to the respective actuators by the actuator control circuit to effect the lateral motion and the variation of the cavity length.

20. The optical sensor system according to claim 19, wherein the description stores a description of all required control signals directly or indirectly,
- wherein the single trigger signal is provided to the actuator control circuit, and
- wherein, in response to the single trigger signal, the actuator control circuit generates the control signals as stored in the description and provides them to the actuators.

* * * * *